US008566934B2

(12) United States Patent
Srivastava et al.

(10) Patent No.: US 8,566,934 B2
(45) Date of Patent: Oct. 22, 2013

(54) APPARATUS AND METHOD FOR ENHANCING SECURITY OF DATA ON A HOST COMPUTING DEVICE AND A PERIPHERAL DEVICE

(75) Inventors: Gita Srivastava, Dallas, TX (US);
Piyush B. Srivastava, Dallas, TX (US)

(73) Assignee: Gigavation, Inc., Dallas, TX (US)

( * ) Notice: Subject to any disclaimer, the term of this patent is extended or adjusted under 35 U.S.C. 154(b) by 106 days.

(21) Appl. No.: 13/011,297

(22) Filed: Jan. 21, 2011

(65) Prior Publication Data

US 2012/0192271 A1 Jul. 26, 2012

(51) Int. Cl.
*G06F 21/00* (2013.01)

(52) U.S. Cl.
USPC ...... 726/22; 726/1; 726/26; 726/34; 713/187; 713/188; 713/189

(58) Field of Classification Search
USPC .............. 713/187–194; 380/255–276; 726/1, 726/22–24, 26, 34
See application file for complete search history.

(56) References Cited

U.S. PATENT DOCUMENTS

| | | | |
|---|---|---|---|
| 6,067,589 A | 5/2000 | Mamata | 710/63 |
| 6,088,802 A * | 7/2000 | Bialick et al. | 726/3 |
| 6,216,183 B1 | 4/2001 | Rawlins | 710/100 |
| 6,311,294 B1 | 10/2001 | Larky et al. | 714/44 |
| 6,343,260 B1 | 1/2002 | Chew | 702/122 |
| 6,366,877 B1 | 4/2002 | Nishino et al. | 703/25 |
| 6,389,495 B1 | 5/2002 | Larky et al. | 710/8 |
| 6,389,560 B1 | 5/2002 | Chew | 714/43 |
| 6,480,801 B2 | 11/2002 | Chew | 702/122 |
| 6,523,081 B1 | 2/2003 | Karlsson et al. | 710/305 |
| 6,601,109 B1 | 7/2003 | Bealkowski et al. | 709/250 |
| 6,618,807 B1 | 9/2003 | Wang et al. | 713/189 |
| 6,671,765 B1 | 12/2003 | Karlsson et al. | 710/310 |
| 6,678,760 B2 | 1/2004 | Brief | 710/52 |
| 6,678,761 B2 | 1/2004 | Garney et al. | 710/60 |
| 6,684,402 B1 | 1/2004 | Wolff | 725/105 |

(Continued)

FOREIGN PATENT DOCUMENTS

WO   WO 2006/090091   8/2006

OTHER PUBLICATIONS

International Searching Authority, International Search Report together with the Written Opinion for International Application No. PCT/US2012/021905, 10 pages, Jul. 30, 2012.

(Continued)

*Primary Examiner* — Hadi Armouche
*Assistant Examiner* — Christopher C Harris
(74) *Attorney, Agent, or Firm* — Sunstein Kann Murphy & Timbers LLP

(57) ABSTRACT

A method is provided of enhancing security of at least one of a host computing device and a peripheral device. In the method, the host computing device is coupled to the peripheral device through a communication interface. The method includes transparently receiving data from one of the peripheral device and the host computing device, and storing the received data. The method further includes analyzing the stored data to identify a circumstance posing a security risk. If analyzing does not identify such a circumstance, then the method includes transparently echoing the data to the other of the peripheral device and the host. If analyzing does identify such a circumstance, then the method includes performing a security process defined by a rule. Related apparatus is provided, as well as other methods and apparatus.

11 Claims, 15 Drawing Sheets

(56) References Cited

U.S. PATENT DOCUMENTS

| | | | |
|---|---|---|---|
| 6,697,372 B1 | 2/2004 | McAlear | 307/402 |
| 6,708,247 B1 | 3/2004 | Barret et al. | 710/313 |
| 6,718,412 B2 | 4/2004 | Purcell et al. | 710/109 |
| 6,721,332 B1 | 4/2004 | McAlear | 370/466 |
| 6,745,264 B1 | 6/2004 | Luke et al. | 710/52 |
| 6,754,811 B1 | 6/2004 | Cato et al. | 712/227 |
| 6,757,770 B1 | 6/2004 | Terada et al. | 710/260 |
| 6,757,776 B1 | 6/2004 | Pew | 710/310 |
| D494,969 S | 8/2004 | Lin | D14/480.7 |
| 6,782,443 B2 | 8/2004 | Ferguson | 710/313 |
| 6,783,078 B1 | 8/2004 | Leaming | 235/492 |
| 6,792,501 B2 | 9/2004 | Chen et al. | 711/103 |
| 6,804,243 B1 | 10/2004 | Humphrey et al. | 370/395.1 |
| 6,839,771 B1 | 1/2005 | Bouchier et al. | 709/253 |
| 6,839,793 B2 | 1/2005 | Ragland | 710/316 |
| 6,880,054 B2 | 4/2005 | Cheng et al. | 711/164 |
| 6,886,055 B2 | 4/2005 | Heller et al. | 710/62 |
| 6,889,265 B2 | 5/2005 | Garney et al. | 710/18 |
| 6,900,988 B2 | 5/2005 | Yen | 361/737 |
| 6,904,493 B2 | 6/2005 | Chiao et al. | 711/103 |
| 6,931,465 B1 | 8/2005 | Cordner | 710/63 |
| 6,934,774 B1 | 8/2005 | Sundaram et al. | 710/19 |
| 6,954,808 B2 | 10/2005 | Russell | 710/62 |
| 6,959,257 B1 | 10/2005 | Larky et al. | 702/120 |
| 6,968,462 B2 | 11/2005 | Challener et al. | 726/26 |
| 6,996,705 B2 | 2/2006 | Cheston et al. | 713/1 |
| 7,003,613 B1 | 2/2006 | Wang et al. | 710/305 |
| 7,011,247 B2 | 3/2006 | Drabczuk et al. | 235/451 |
| 7,039,759 B2 | 5/2006 | Cheng et al. | 711/115 |
| 7,044,390 B2 | 5/2006 | Leaming | 235/492 |
| 7,051,124 B2 | 5/2006 | Ishida et al. | 710/29 |
| 7,069,373 B2 | 6/2006 | Teng | 710/310 |
| 7,073,010 B2 | 7/2006 | Chen et al. | 710/313 |
| 7,080,789 B2 | 7/2006 | Leaming | 235/492 |
| 7,082,483 B2 | 7/2006 | Poo | 710/68 |
| 7,114,105 B2 | 9/2006 | Rao et al. | 714/38.1 |
| 7,124,233 B2 | 10/2006 | Tang | 710/313 |
| 7,127,649 B2 | 10/2006 | Leaming | 714/715 |
| 7,143,208 B2 | 11/2006 | Tsutsui | 710/33 |
| 7,143,224 B2 | 11/2006 | Leaming | 710/301 |
| 7,145,481 B2 | 12/2006 | Cooper | 341/26 |
| 7,149,833 B2 | 12/2006 | McLeod | 710/300 |
| 7,162,407 B2 | 1/2007 | Poley et al. | 703/24 |
| 7,168,029 B2 | 1/2007 | Lai et al. | 714/781 |
| 7,181,649 B2 | 2/2007 | Fruhauf et al. | 714/32 |
| 7,185,136 B2 | 2/2007 | Zarns | 710/315 |
| 7,188,206 B2 | 3/2007 | Tung et al. | 710/302 |
| 7,213,096 B2 | 5/2007 | Keys et al | 710/313 |
| 7,213,766 B2 | 5/2007 | Ryan et al. | 235/492 |
| 7,222,201 B2 | 5/2007 | Augustin et al. | 710/105 |
| 7,228,366 B2 | 6/2007 | Abramson et al. | 710/19 |
| 7,243,237 B2 | 7/2007 | Peinado et al. | 713/181 |
| 7,272,831 B2 | 9/2007 | Cota-Robles et al. | 718/1 |
| 7,296,098 B2 | 11/2007 | Shih | 710/13 |
| 7,321,951 B2 | 1/2008 | Wong et al. | 711/103 |
| 7,328,849 B2 | 2/2008 | Leaming | 235/492 |
| 7,337,261 B2 | 2/2008 | Sukegawa et al. | 710/313 |
| 7,351,147 B2 | 4/2008 | Stockdale et al. | 463/29 |
| 7,353,399 B2 | 4/2008 | Ooi et al. | 713/186 |
| 7,359,997 B2 | 4/2008 | Ishida et al. | 710/31 |
| 7,364,436 B2 | 4/2008 | Yen | 439/76.1 |
| 7,369,982 B2 | 5/2008 | Leaming | 703/25 |
| 7,373,522 B2 | 5/2008 | Leaming | 713/193 |
| 7,396,257 B2 | 7/2008 | Takahashi | 439/620.21 |
| 7,418,377 B2 | 8/2008 | Poley et al. | 703/24 |
| 7,447,037 B2 | 11/2008 | Hiew et al. | 361/737 |
| 7,447,821 B2 | 11/2008 | Ferchau et al. | 710/301 |
| 7,454,531 B2 | 11/2008 | Shih | 710/13 |
| 7,454,783 B2 | 11/2008 | Dupouy et al. | 726/7 |
| 7,461,318 B2 | 12/2008 | Fukae et al. | 714/749 |
| 7,469,343 B2 * | 12/2008 | Ray et al. | 713/189 |
| 7,478,424 B2 * | 1/2009 | Mester et al. | 726/11 |
| 7,480,931 B2 | 1/2009 | Weiss | 726/2 |
| 7,489,417 B2 | 2/2009 | Tran et al. | 358/1.16 |
| 7,490,255 B2 | 2/2009 | Diefenbaugh et al. | 713/320 |
| 7,493,431 B2 | 2/2009 | McLeod | 710/63 |
| 7,496,493 B1 | 2/2009 | Stevens | 703/24 |
| 7,516,261 B2 | 4/2009 | Ferchau et al. | 710/301 |
| 7,540,024 B2 | 5/2009 | Phillips et al. | 726/20 |
| 7,549,161 B2 | 6/2009 | Poo et al. | 726/5 |
| 7,555,578 B2 | 6/2009 | Lim et al. | 710/52 |
| 7,587,536 B2 | 9/2009 | McLeod | 710/65 |
| 7,597,250 B2 | 10/2009 | Finn | 235/380 |
| 7,631,121 B2 | 12/2009 | Poo | 710/52 |
| 7,634,670 B2 | 12/2009 | Nago et al. | 713/300 |
| 7,636,844 B2 | 12/2009 | Bajikar | 713/171 |
| 7,640,378 B2 | 12/2009 | McLeod | 710/29 |
| RE41,076 E | 1/2010 | Chu | 726/34 |
| 7,644,211 B2 | 1/2010 | Toebes et al. | 710/106 |
| 7,647,446 B2 | 1/2010 | Okuma | 710/313 |
| D610,156 S | 2/2010 | Mudrick | D14/480.5 |
| 7,664,960 B1 | 2/2010 | Clubb | 713/184 |
| RE41,294 E | 4/2010 | Chu | 713/193 |
| 7,702,825 B2 | 4/2010 | Howard | 710/18 |
| 7,703,688 B2 | 4/2010 | Drabczuk et al. | 235/492 |
| 7,704,147 B2 | 4/2010 | Quraishi et al. | 463/42 |
| 7,711,874 B1 | 5/2010 | Ilyasov et al. | 710/52 |
| 7,725,610 B2 | 5/2010 | Hosokawa | 710/6 |
| 7,733,902 B2 | 6/2010 | Coulier | 370/466 |
| 7,734,841 B2 | 6/2010 | Townsend | 710/16 |
| 7,743,409 B2 | 6/2010 | Gonzalez et al. | 726/9 |
| 7,747,797 B2 | 6/2010 | Abraham et al. | 710/62 |
| 7,748,031 B2 | 6/2010 | Gonzalez et al. | 726/9 |
| 7,761,646 B2 | 7/2010 | Okuma | 710/313 |
| 7,762,470 B2 | 7/2010 | Finn et al. | 235/492 |
| 7,773,732 B2 | 8/2010 | Gesquiere et al. | 379/93.01 |
| 7,788,447 B2 | 8/2010 | Deng et al. | 711/115 |
| 7,793,014 B2 | 9/2010 | Paley et al. | 710/36 |
| 7,870,599 B2 | 1/2011 | Pemmaraju | 726/2 |
| 7,877,788 B1 * | 1/2011 | Topp et al. | 726/4 |
| 2006/0156415 A1 | 7/2006 | Rubinstein et al. | 726/27 |
| 2006/0173980 A1 | 8/2006 | Kobayashi et al. | 709/222 |
| 2007/0261118 A1 | 11/2007 | Lu | 726/24 |
| 2008/0276302 A1 * | 11/2008 | Touboul | 726/3 |
| 2009/0043925 A1 | 2/2009 | Govindaraman | 710/38 |
| 2009/0064273 A1 * | 3/2009 | Buer | 726/1 |
| 2009/0235365 A1 | 9/2009 | Kuo et al. | 726/29 |
| 2009/0307452 A1 | 12/2009 | Hahn et al. | 711/164 |
| 2010/0031336 A1 * | 2/2010 | Dumont et al. | 726/9 |
| 2011/0289548 A1 * | 11/2011 | Heidenreich et al. | 726/1 |
| 2012/0042099 A1 * | 2/2012 | Wong et al. | 726/18 |

OTHER PUBLICATIONS

International Searching Authority, International Search Report together with the Written Opinion for International Application No. PCT/US2012/050213, 11 pages, Jan. 24, 2013.

* cited by examiner

APPARATUS AND METHOD FOR ENHANCING SECURITY OF DATA ON A HOST COMPUTING DEVICE AND A PERIPHERAL DEVICE

TECHNICAL FIELD

The present invention relates to an apparatus and method for enhancing security of data on at least one of a host computing device and a peripheral device, and more particularly when such devices are engaged in communication through a communication interface.

SUMMARY OF THE EMBODIMENTS

In a first embodiment of the invention there is provided a method of enhancing security of at least one of a host computing device and a peripheral device. The host computing device is removably coupled to the peripheral device through a communication interface. The method includes transparently receiving data from one of the peripheral device and the host computing device, storing the received data, and analyzing the stored data to identify a circumstance posing a security risk. The method further includes if analyzing does not identify such a circumstance, then transparently echoing the data to the other of the peripheral device and the host. The method further includes if analyzing does identify such a circumstance, then performing a security process defined by a rule. The method optionally may further include implementing a preservation process that precludes inter-device communication termination.

In another embodiment of the invention there is provided a method of enhancing security of at least one of a host computing device and a peripheral device. The host computing device is removably coupled to the peripheral device through a communication interface. The method includes receiving data from one of the peripheral device and the host computing device, storing the received data, implementing a preservation process that precludes inter-device communication termination, and analyzing the stored data to identify a circumstance posing a security risk. The method further includes if analyzing does not identify such a circumstance, then echoing the data to the other of the peripheral device and the host. The method further includes if analyzing does identify such a circumstance, then performing a security process defined by a rule. Alternatively, or in addition, the preservation process includes sending a signal other than a data echo. In a further related embodiment, the signal is a no-acknowledge signal.

With respect to embodiments in the foregoing paragraphs, analyzing optionally includes implementing an analyzing process that tests the received data against a database to identify a circumstance posing a security risk. Also optionally, a further embodiment further includes causing the database to be updated to include additional circumstances posing a security risk. Alternatively or in addition, the analyzing process includes accessing the database with a hash algorithm.

In related embodiments, the security process includes encrypting data being sent to the peripheral device. The security process optionally includes one or more of: restricting communication between the host and the peripheral in accordance with the rule, modifying data in accordance with the rule, and delaying transmission of data between the host and the peripheral in accordance with the rule. Also optionally, the security process implements a secondary process that includes storing a log copy of at least a portion of the data. The security process optionally implements a secondary process that includes notifying a user over a second communication interface. The rule optionally is selected based on a nature of the peripheral device. In a further related embodiment, the rule also is dynamic and selected based on an input provided by the host device. In another related embodiment, the rule is dynamic and is selected based on an input provided by a user. In another related embodiment, the rule is dynamic and is selected based on a state describing at least one of the host, the peripheral, and the communication interface. In another related embodiment, the rule is dynamic and is selected from a plurality of rules, and the plurality of rules is stored on the host device. In another related embodiment, the rule is dynamic and is selected from a plurality of rules, and the plurality of rules is stored on the peripheral device. In another related embodiment, the rule is dynamic and is selected from a plurality of rules, and the plurality of rules is stored on a module that implements the processes for enhancing security.

Optionally, the rule is dependent on a characteristic of the data. Also optionally, the rule is selected based on a configuration of the host computing device. Alternatively, the rule is selected based on a protocol of the communication interface. Alternatively, the security process comprises an isolation process that electrically isolates the peripheral device from the host computing device.

In a further embodiment, there is provided a method of enhancing security of at least one of a host computing device and a peripheral device having a human interface, wherein the host computing device is removably coupled to the peripheral device through a communication interface. The method of this embodiment includes receiving data from the peripheral device characterizing its nature and implementing an authentication process based on the received data; such process includes issuing a challenge requiring a user response to be entered on the peripheral device. The method also includes analyzing data received from the peripheral device purporting to be attributable to the user response to determine whether the peripheral device behaves in a manner expected based on its nature.

In related embodiments, the challenge is issued via a display or, alternatively, via a sound. The method optionally further includes, if the peripheral device remains idle for a specified period of time, repeating the processes of implementing the authentication process and analyzing data.

In a further embodiment, there is provided a method of customizing user input capabilities from a peripheral device to a host computing device, wherein the host computing device is removably coupled to the peripheral device through a communication interface. The method of this embodiment includes (a) receiving data from the peripheral device characterizing its nature, (b) receiving data from the peripheral device purporting to be attributable to user input, (c) storing the data received in steps (a) and (b), and analyzing the data stored in step (c) to identify a circumstance defined by an identification rule. The method further includes if analyzing does not identify such a circumstance, then echoing the data to the host computing device. The method further includes if analyzing does identify such a circumstance, then performing a customization process defined by a customization rule.

In a related embodiment, the identification rule identifies a circumstance associated with a risk of malicious activity. In another related embodiment, the identification rule identifies a user-specified emergency, and the customization rule includes triggering a response to the emergency. Optionally, the customization process includes modifying the data purporting to be attributable to user input. Optionally, the customization process precludes communication of at least a portion of the data purporting to be attributable to user input to the host computing device. In a related embodiment, the circumstance poses a security risk and the customization process includes implementing countermeasures determined by rule to reduce the security risk. In another related embodiment, implementing countermeasures includes executing them on the host computing device.

In a further embodiment there is provided a method of enhancing security of data that are communicated between a host computing device removably coupled to a peripheral device through a communication interface. The method of this embodiment includes identifying, at a file level, data being subject to a write command to the peripheral device, encrypting the file level data, according to a rule, with an encryption process, and causing storage of the encrypted file level data on the peripheral device. In a related embodiment, the encryption process is selected independently for each file that is encrypted.

In a further embodiment, there is provided a method of enhancing security of data that are communicated between a host computing device removably coupled to a peripheral device through a communication interface. The method of this embodiment includes identifying data at a file level being subject to a read command from the peripheral device, decrypting the file level data, according to a rule, with a decryption process, and causing storage of the decrypted file level data on the host computing device.

In a related embodiment, the decryption process is selected independently for each file that is decrypted. In a related embodiment, the rule is selected based on a characteristic of the data to be transmitted. In another related embodiment, the rule is selected based on at least one of a nature of the peripheral and a state describing the peripheral. In another related embodiment, the rule is selected based on at least one of a configuration of the host computing device and a state describing the host computing device. In another related embodiment, the rule is selected based on an identity of a user determined in an authentication process.

In a further embodiment there is provided a method of enhancing security of data that are communicated between a host computing device removably coupled to a peripheral device through a communication interface. The method of this embodiment includes receiving data from the host computing device, storing the received data, implementing a preservation process that precludes inter-device communication termination, analyzing the stored data to determine an analysis of what part thereof, if any, to encrypt, encrypting the stored data in accordance with the analysis, and causing the encrypted data to be transferred to the peripheral device.

In a further embodiment there is provided a method of enhancing security of data that are communicated between a host computing device removably coupled to a peripheral device through a communication interface. The method of this embodiment includes receiving data from the peripheral device, storing the received data, implementing a preservation process that precludes inter-device communication termination, analyzing the stored data to determine an analysis of what part thereof, if any, to decrypt, decrypting the stored data in accordance with the analysis, and causing the encrypted data to be transferred to the host computing device.

In a related embodiment, the analysis is performed based on a characteristic of the data to be transmitted. In another related embodiment, the analysis is performed based on at least one of a nature of the peripheral and a state describing the peripheral. In another related embodiment, the analysis is performed based on at least one of a configuration of the host computing device and a state describing the host computing device. In another related embodiment, the analysis is performed based on an identity of a user determined in an authentication process.

In further embodiments there is provided a security device comprising a hardware arrangement configured to cause implementation of the method according to any of the previously described embodiments.

In a further embodiment there is provided a security device for enhancing security of at least one of a host computing device and a peripheral device; the host computing device is removably coupled to the peripheral device through a communication interface. The security device of this embodiment includes an apparatus running processes including transparently receiving data from one of the peripheral device and the host computing device, storing the received data, and analyzing the stored data to identify a circumstance posing a security risk. The method further includes if analyzing does not identify such a circumstance, then transparently echoing the data to the other of the peripheral device and the host. The method further includes if analyzing does identify such a circumstance, then performing a security process defined by a rule.

In a further embodiment there is provided a security device for enhancing security of at least one of a host computing device and a peripheral device; the host computing device is removably coupled to the peripheral device through a communication interface. The security device includes an apparatus running processes including receiving data from one of the peripheral device and the host computing device, storing the received data, implementing a preservation process that precludes inter-device communication termination, and analyzing the stored data to identify a circumstance posing a security risk. The processes being run by the apparatus further include if analyzing does not identify such a circumstance, then echoing the data to the other of the peripheral device and the host; and if analyzing does identify such a circumstance, then performing a security process defined by a rule.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
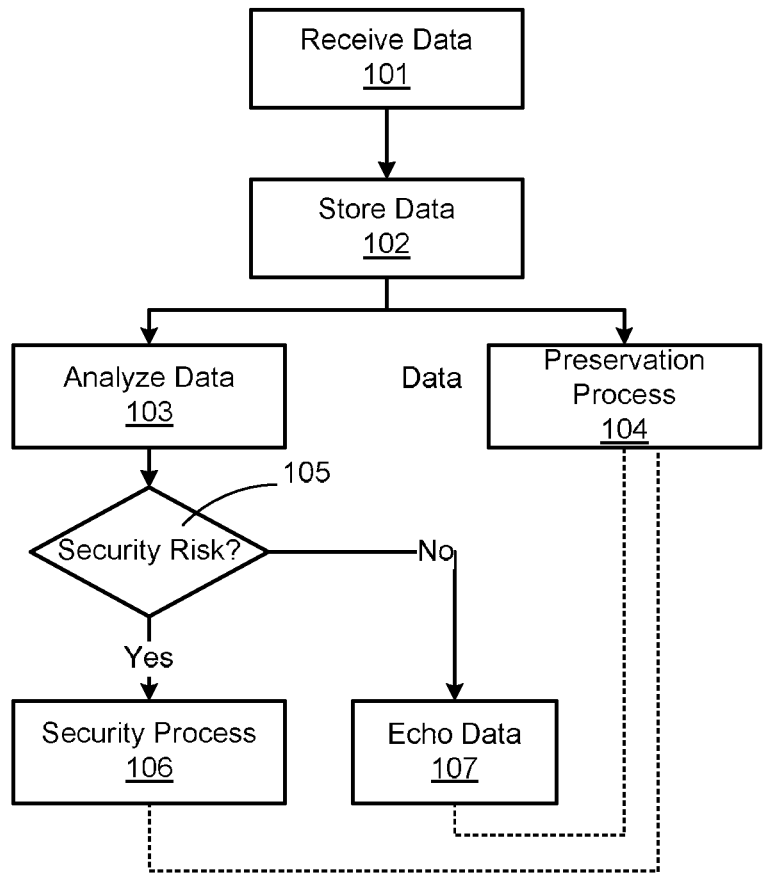
FIG. 1 is a block diagram of logical processes performed in accordance with an embodiment of the present invention.

Definitions. As used in this description and the accompanying claims, the following terms shall have the meanings indicated, unless the context otherwise requires:

A "host computing device" is a device having a processor configured to run a host computing process. The host computing device may be all or a part of a computing system.

A "peripheral device" is a component that is removably connectable and physically proximate to a host computing device that is configured to have bidirectional communication with the host computing device through a communication interface. The peripheral device may be at least one of: contained in the host computing device, plugged into the host computing device, and physically distinct from the host computing device. A peripheral is "physically proximate" to the host computing device if it is sufficiently close to the device as to permit communication between the peripheral and the host computing device through the communication interface. As an example, a peripheral device may be a USB device that is removably connectable to a host computing device through a USB port. The peripheral device may operate with a wireless USB connection as well.

"Analyzing" is a computer process.

"Receiving from one of" two sources, includes receiving from both.

A "circumstance posing a security risk" is a circumstance, beyond garbling of data in a physical layer or transmission layer, deemed to put data at risk of unauthorized access, destruction, or disruption in availability.

"Implementing a preservation process that precludes inter-device communication termination" includes and is not limited to (i) acting fast enough that inter-device termination does not occur as well as (ii) issuing signals indicating receipt of data.

The "nature" of a peripheral device includes its functionality (for example, keyboard, hub, or printer) and optionally its identity (vendor ID, product ID, MAC Address).

The "configuration" of a host includes at least one of its hardware configuration, its software configuration (including its operating system), its network configuration (for example, network size/type, network connectivity) and its identity (vendor ID, product ID, MAC Address).

A "characteristic" of data includes at least one of its type (for example, metadata, executable, or text file), size, protocol used for sending of the data, value of the data, and any other property that may be derived from the data.

The "state" of a host, or peripheral, or a communication interface is a set of logical values characterizing the status of a state machine corresponding thereto.

"Coupled" includes indirect coupling through an intermediary device.

"Transparently" means carrying on communication in such a manner that the recipient of the communication fails to detect an additional node in the course of communication. Thus when a device communicates with a peripheral or with a host computing device and does not appear to the peripheral or the host computing device, as the case may be, as an additional node, the communication is performed "transparently". It is possible for a device to engage in communication with a peripheral or a host on one occasion, for example, when first connected to a host, in a manner as to appear to the host as a node, even though the same device might later engage in communication with the host and with a peripheral and fail to appear to the host and to the peripheral as a node. In the latter case, the communication is still deemed to be performed "transparently".

FIG. 1 is a block diagram of logical processes performed in accordance with an embodiment of the present invention. In this embodiment, under process 101, data is "transparently" received from one of the peripheral devices and the host computing devices. Use of the term "transparently", as defined above, means that communication of data is achieved in a way that the host and peripheral fail to see an additional node receiving the data. In process 102, the received data is stored. In addition, this embodiment optionally includes implementing a preservation process 104 that precludes inter-device communication termination—in particular, the preservation process 104 precludes termination of communication between the peripheral and the host. In addition, while process 104 is ongoing, process 103 analyzes the stored data. In decision process 105, there is a determination of whether a security risk is posed. If no risk is posed, data is transparently echoed, in process 107, to the other of the peripheral and the host. In other words, the processes herein are interposed in communications between the host and the peripheral. If no risk is posed, then data communications between the host and the peripheral are enabled. On the other hand, if process 105 determines that a security risk is posed, then there is performed a security process 106.

The processes shown in FIG. 1 may optionally be performed in an apparatus that is physically separate from the host and the peripheral. In another embodiment, however, the processes may be performed in hardware that is integrated into the host computing device. For example, software for performing the processes may be integrated into the host at the kernel or BIOS level. Alternatively, the processes may be integrated into at least one of the USB root hub and the south bridge. In yet additional embodiments, the processes may be performed in the peripheral device itself by direct integration into the peripheral or in a component that is physically coupled to the peripheral to make a compound device. In particular, among other things, the security process may be performed in hardware or in software in any of the foregoing locations.

In one embodiment, at least one of the data to be analyzed and results derived from analyzing the data are stored in a database. The user also optionally may be notified of processes that are occurring. For example, LED indicators may be used to indicate a state of at least one of the host computing device and the peripheral device. Optionally, when the processes of FIG. 1 are performed in an apparatus physically separate from the host and the peripheral, the LED indicators may be coupled to the apparatus, and, in a further embodiment, mounted to the apparatus.

The rules governing operation of the security process 106 also may be configurable by a user. For example, the user may specify which kinds of peripherals (e.g., cameras, printers) may be connected to the host. Further parameters also may be configured, such as specification of alternative rules according to an amount of time taken by data transfer to reach completion. One rule may be to disable all downstream hubs. The rules may be stored locally or globally and may be dynamic. The rules may be dependent on the operating system or drivers on the host computing device or peripheral device. Rules may also discriminate between types of peripherals (e.g. keyboard, hard drive, camera, phone, etc.), types of data files (e.g. executable, text file, .xls, etc.), types of host (e.g. computer by name of A, computer in group A, windows machine, etc.), type of intercepting device/module (e.g. by model number or group number), and any other possible desired basis for discrimination.

Figure 2:
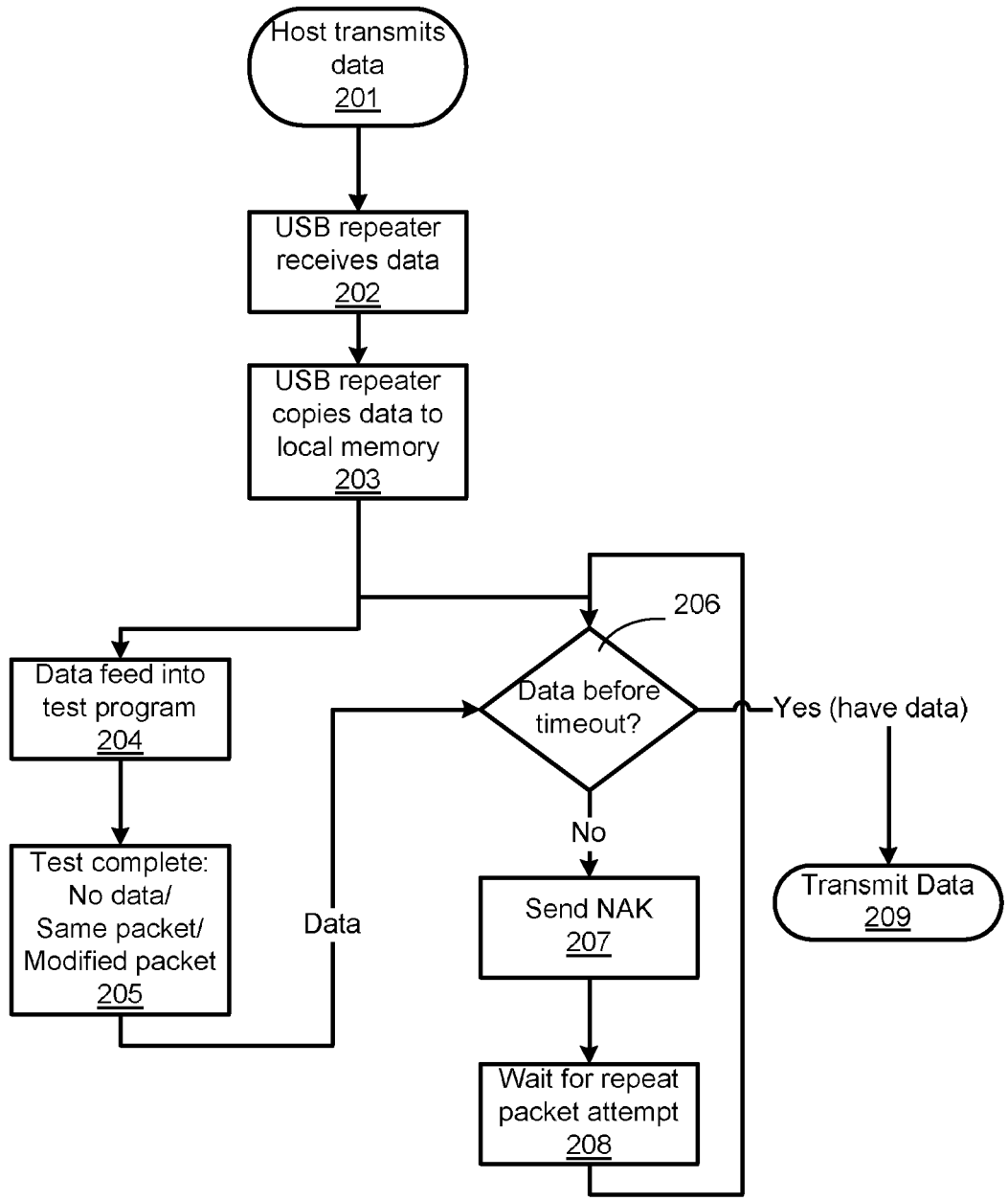
FIG. 2 is a block diagram, of a further embodiment of the present invention, with details of implementation of the preservation process 104 of FIG. 1 in communication processes from a host computing device to a peripheral device.

FIG. 2 is a block diagram, of a further embodiment of the present invention, with details of implementation of the preservation process 104 of FIG. 1, in communication processes from a host computing device to a peripheral device. In FIG. 2, under process 201, the host computing device transmits data over a Universal Serial Bus (USB) to a device we here called a "USB repeater," which implements the processes of FIG. 1. In process 202, the USB repeater receives the data. In process 203, the repeater stores the received data in its local memory. In process 204, the data is fed to a test program, which, in process 205, analyzes the data in accordance with processes 103, 105, and 106 of FIG. 1. As discussed in connection with FIG. 1, data is echoed in process 107 if there has not been a determination of a security risk in process 105 following analysis in process 103. If there is a determination of a security risk, then either no data or a modified packet is issued in process 205.

In addition, the embodiment of FIG. 2 includes a preservation process. More particularly, processes 103 and 105 of FIG. 1 may require some time to be completed, and a preservation process 104 is implemented in the embodiment of FIG. 2 to provide this time. In decision process 206, there is a determination whether data has been made available by process 205 before timeout, and if data is thus available, then in process 209 data is transmitted to the peripheral. If there is no data to transmit from the process 205, then program logic operates in process 207 to send a not-acknowledge (NAK) to the host and in process 208 to wait for a repeated attempt to send the packet by the host. This exemplary preservation process precludes termination of inter-device communication between the host computing device and the peripheral device.

Figure 3:
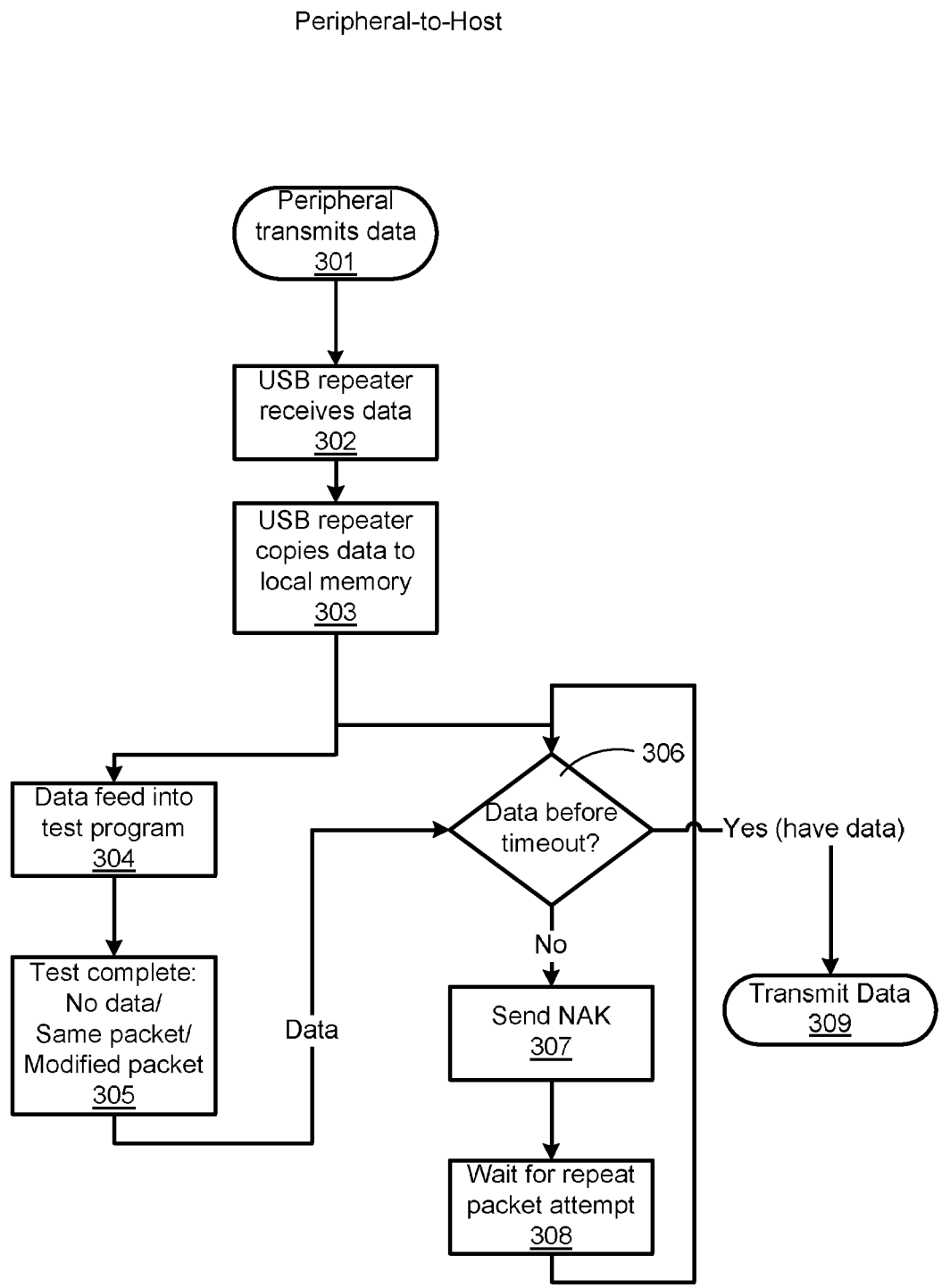
FIG. 3 is a block diagram, of the embodiment of FIG. 2, with details of implementation of the preservation process 104 of FIG. 1 in communication processes from the peripheral device to the host computing device.

FIG. 3 is a block diagram, of the embodiment of FIG. 2, with details of implementation of the preservation process 104 of FIG. 1, in communication processes from the peripheral device to the host computing device. The processes represented are symmetric to those in FIG. 2. The data is received from the peripheral device instead of the host computing device. Thus in FIG. 3, under process 301, the peripheral device transmits data over a Universal Serial Bus (USB) to the USB repeater, which (as previously stated) implements the processes of FIG. 1. In process 302, the USB repeater receives the data. In process 303, the repeater stores the received data in its local memory. In process 304, the data is fed to a test program, which, in process 305, analyzes the data in accordance with processes 103, 105, and 106 of FIG. 1. As discussed in connection with FIG. 1, data is echoed in process 107 if there has not been a determination of a security risk in process 105 following analysis in process 103. In a manner analogous to FIG. 2, if there is a determination of a security risk, then either no data or a modified packet is issued in process 305.

As stated in connection with the embodiment of FIG. 2, the embodiment of FIG. 3 similarly includes a preservation process. More particularly, processes 103 and 105 of FIG. 1 may require some time to be completed, and a preservation process 104 is implemented in the embodiment of FIG. 3 to provide this time. In decision process 306, there is a determination whether data has been made available by process 305 before timeout, and if data is thus available, then in process 309 data is transmitted to the host computing device. If there is no data to transmit from the process 305, then program logic operates in process 307 to send a not-acknowledge (NAK) to the peripheral and in process 308 to wait for a repeated attempt to send the packet by the peripheral. As in FIG. 2, this exemplary preservation process precludes termination of inter-device communication between the host computing device and the peripheral device.

Figure 4:
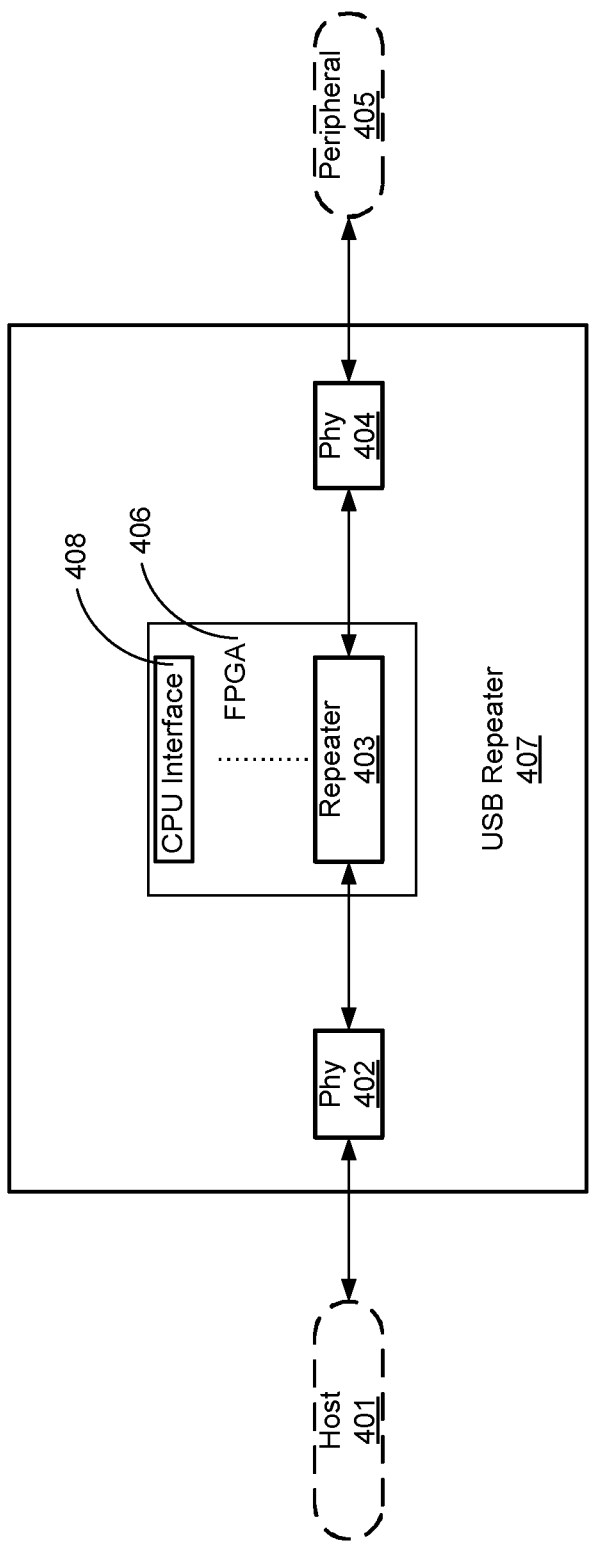
FIG. 4 is a block diagram of the architecture of a hardware embodiment of the present invention.

FIG. 4 is a block diagram of the architecture of a hardware embodiment of the present invention. The hardware can be viewed as a hardware USB repeater 407 that is placed between the host computing device 401 and the peripheral device 405. The embodiment shown in FIG. 4 includes three modules. The host computing device interface is through the physical layer 402. The peripheral device interface is through the physical layer 404. Physical layers 402 and 404 are in communication with a main module 406 which includes a CPU interface 408 and a repeater 403. Module 406, which may be embodied in a field-programmable gate array (FPGA), implements the processes described above in connection with FIGS. 1-3, and as further described below. In an alternative embodiment, items 402, 406, and 404 may be integrated into a single module.

Figure 5:
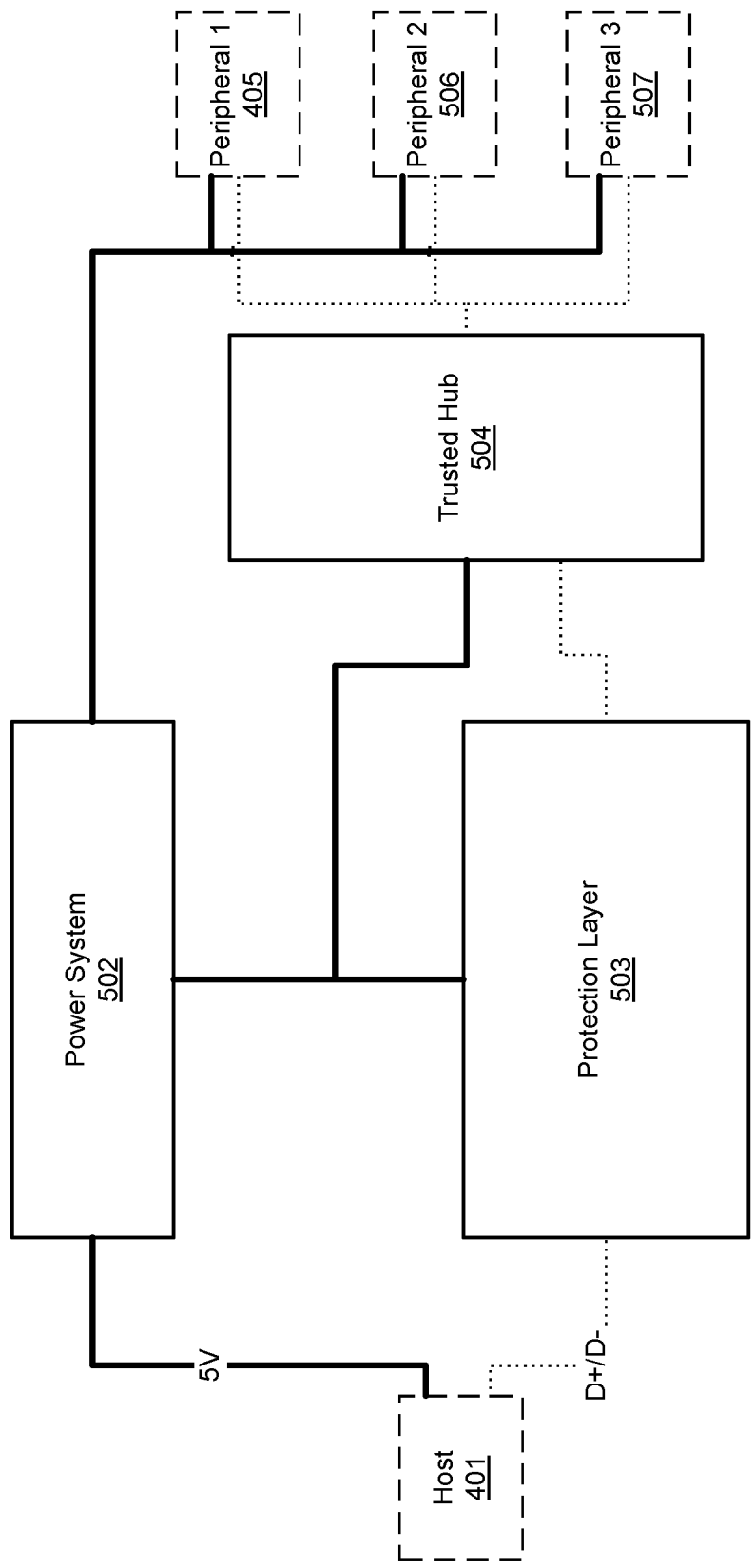
FIG. 5 is a block diagram of a hardware embodiment of the present invention providing further details for implementation of the embodiment of FIG. 4.

FIG. 5 is a block diagram of a hardware embodiment of the present invention providing further details for implementation of the embodiment of FIG. 4. The embodiment of FIG. 5 includes three modules: a power module 502, a data module 503, and a trusted hub 504, which are in communication with each other and with the host computing device 401 and peripheral devices 405, 506, and 507. The data module may optionally include an isolation arrangement that electrically isolates the data lines. The isolation arrangement may be implemented by one or more of optical isolation, mechanical relays, and electrical buffering, to add a method of separation in the data lines.

Figure 6:
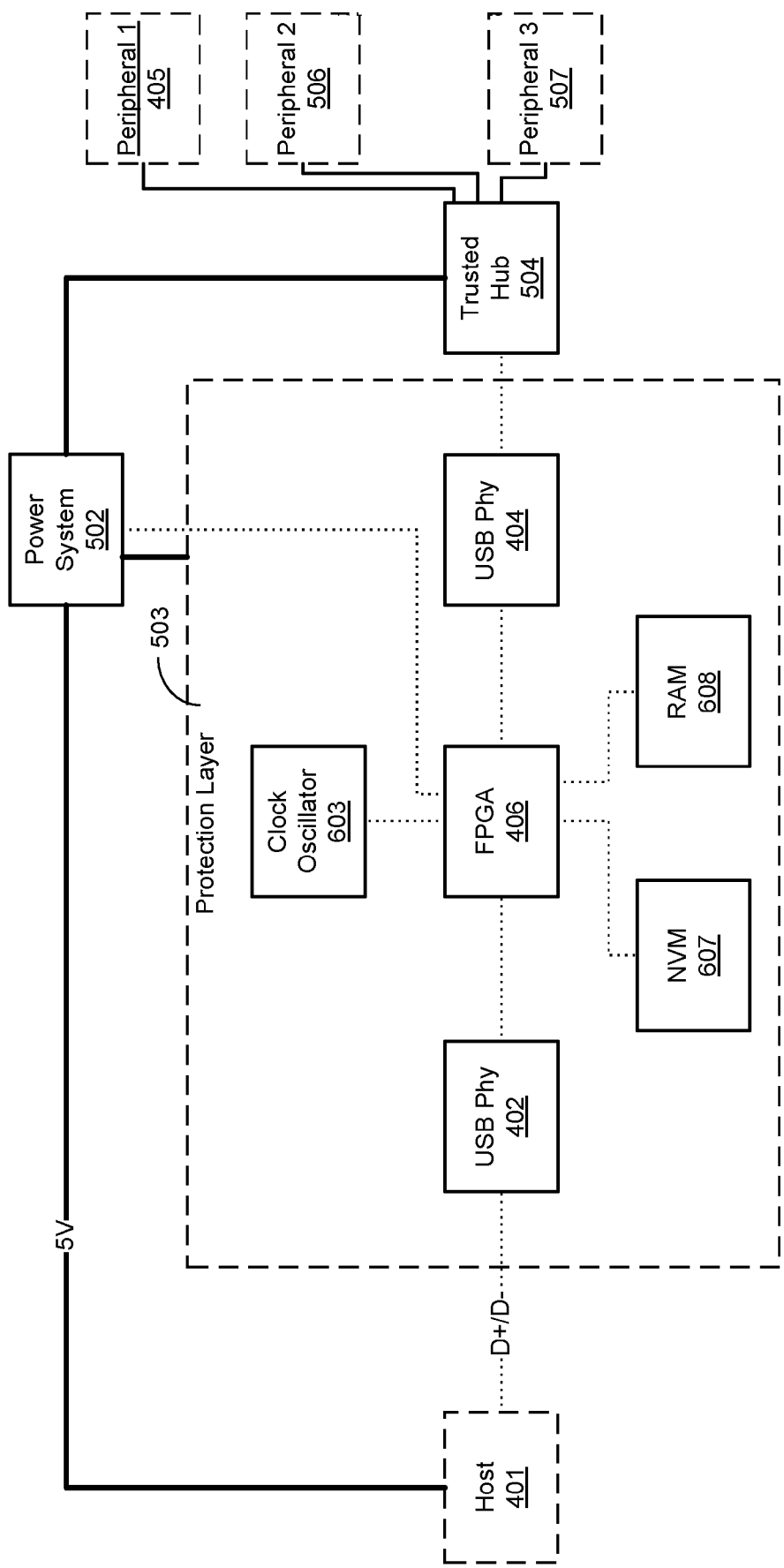
FIG. 6 is block diagram providing detail of the data module of the embodiment of FIG. 5.

FIG. 6 is block diagram providing detail of the data module of the embodiment of FIG. 5. In the embodiment shown in FIG. 6, a protection layer 503 is implemented with USB Physical Layers 402 and 404 in communication with a main module FPGA 406. A non-volatile memory 607 and random access memory (RAM) 608 also are coupled to FPGA 406, along with clock oscillator module 603.

Figure 7:
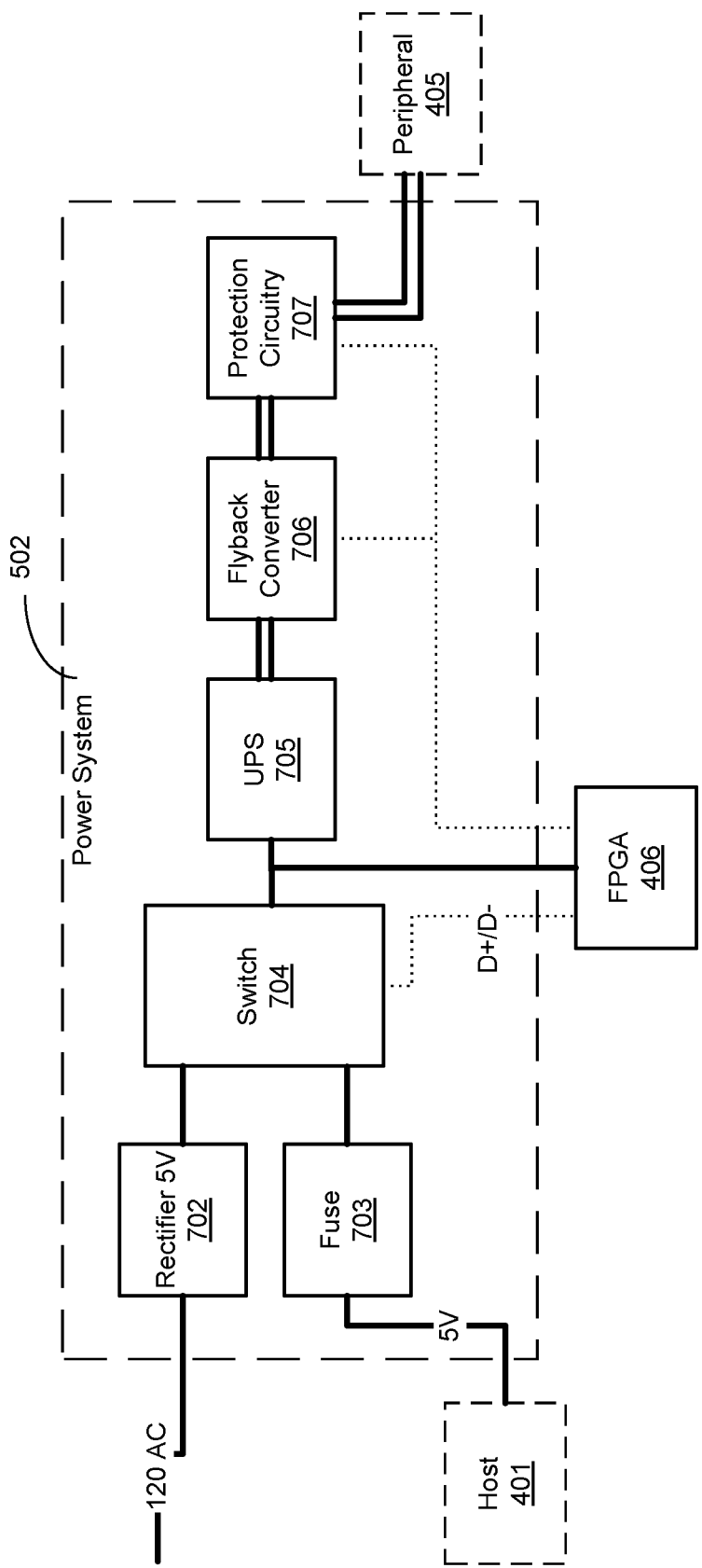
FIG. 7 is block diagram providing detail of the power module of the embodiment of FIG. 5.

FIG. 7 is block diagram providing detail of the power module of the embodiment of FIG. 5. The power module is coupled to the host computing device 401 and the peripheral device 405. A switch 704, which is typically electronically operated, selectively provides power derived either from a 110 v ac line though rectifier 702 or from the host computing device power protected by a fuse 703. The switched power supplies the FPGA 406 and an uninterruptible power supply 705, which, through flyback converter 706 and protection circuitry 707, supplies power to the peripheral 405.

In further related embodiments, the power module contains internal active clamp circuitry that provides a dedicated power system defense to protect the host computing device and the peripheral device from power disruptions. The power system defense electrically isolates the 5V and ground power lines. The electrical isolation protects the host computing device and the peripheral device from conditions such as over-voltage or over-current. In this embodiment, an attempt by the host computing device or peripheral device to pull more current than is allowed triggers a protection process, which performs at least one of the following countermeasures: locking out the port in question, notifying the user of a violation of specification, requesting that the user physically disconnect the device in violation, and re-enabling the connection. In some embodiments a super-capacitor or battery technology may be used to provide power isolation in the event of a power surge.

Figure 8:
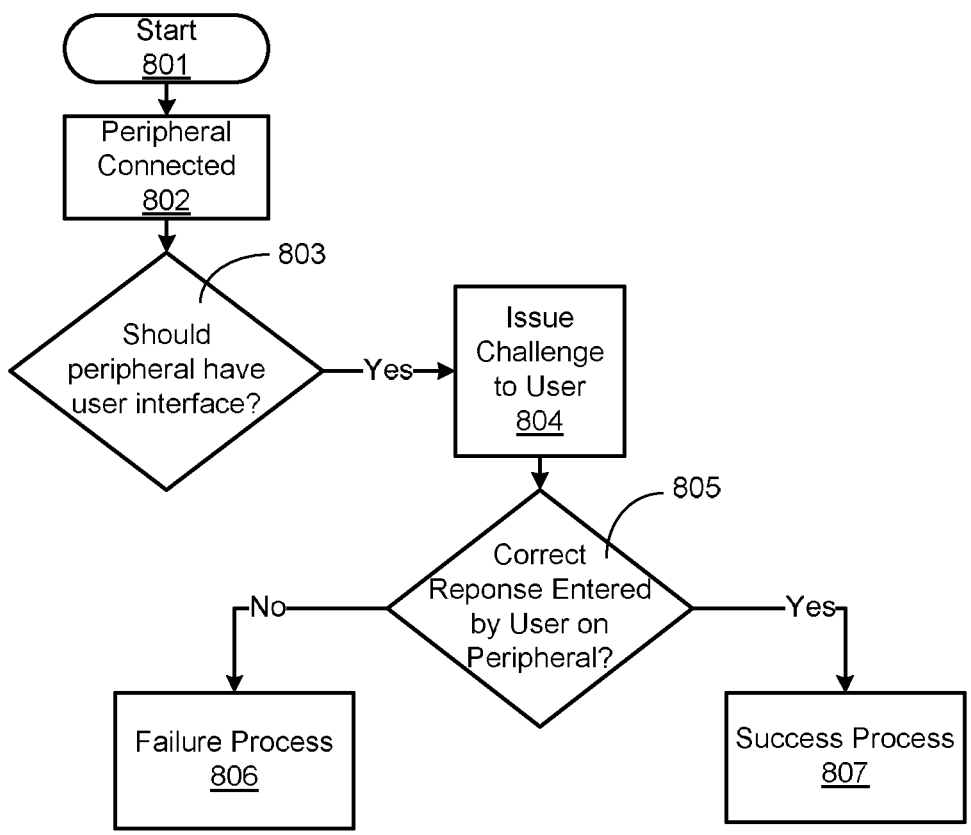
FIG. 8 is a block diagram showing logical flow of peripheral authentication processes in accordance with an embodiment of the present invention.

FIG. 8 is a block diagram showing logical flow of peripheral authentication processes in accordance with an embodiment of the present invention. The illustrated process starts at item 801. At item 802, the peripheral is connected and data characterizing a nature of the peripheral is received from the peripheral device. In decision process 803, if the nature of the peripheral includes having a user interface, an authentication process issues a challenge to the user 804. According to some embodiments the challenge may be issued via a display located on one of the host computing device, security module, peripheral device, and external module. Alternatively, or in addition, the challenge may be an auditory or haptic challenge. Furthermore, the host computing device and the peripheral device may be prevented from having access to the challenge in order to add security. In decision process 805, the data received from the peripheral device is analyzed. In the illustrated embodiment, a failure process 806 or a success process 807 is implemented depending on the user response.

Figure 9:
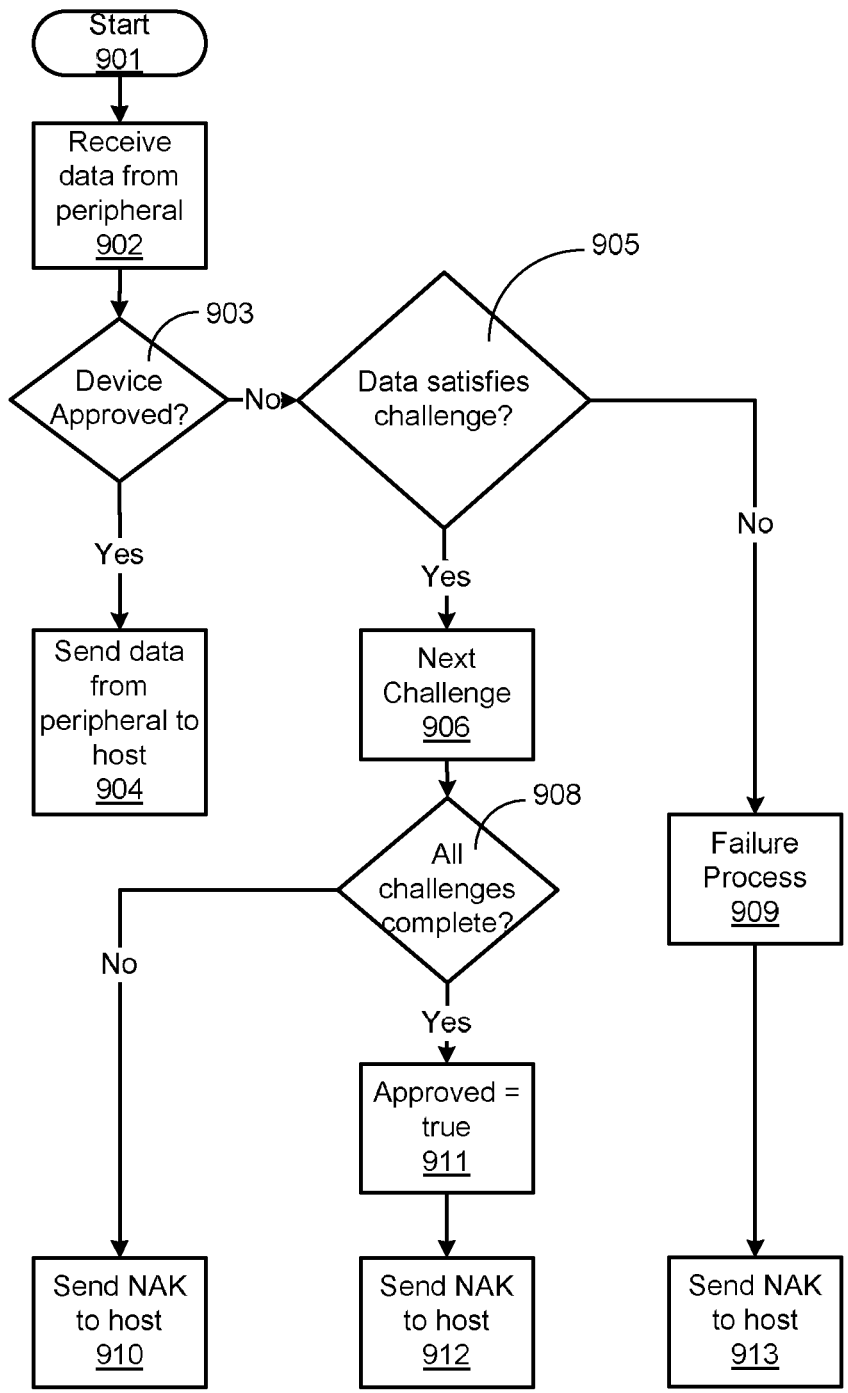
FIG. 9 is a block diagram providing further detail of the processes illustrated in FIG. 8.

FIG. 9 is a block diagram providing further detail of the processes illustrated in FIG. 8. The illustrated process starts at item 901. At item 902, data characterizing the nature of the peripheral device is received from the peripheral device. In process 903, there is a test whether the device is approved based on the data. If the device is approved in process 903, then data is sent in process 904 from the peripheral device to the host device. If the device is not approved in process 903, then a challenge process 905 is performed requiring a user response to be entered on the peripheral device. The data received from the peripheral device purporting to be attributable to the user response is analyzed. If the data does not satisfy the challenge process 905, failure process 909 is initiated, followed by a NAK sent to the host in process 913. If the data received from the peripheral device satisfies the challenge process 905, then a further challenge is presented in process 906. In process 908, there is testing to determine whether the challenge processes have been completed, and if not completed, then in process 910, a NAK is sent to the host. If in process 908 it is determined that the challenge processes have been completed, then in process 911 there is issued device approval, and a NAK is sent to the host in process 912.

Figure 10:
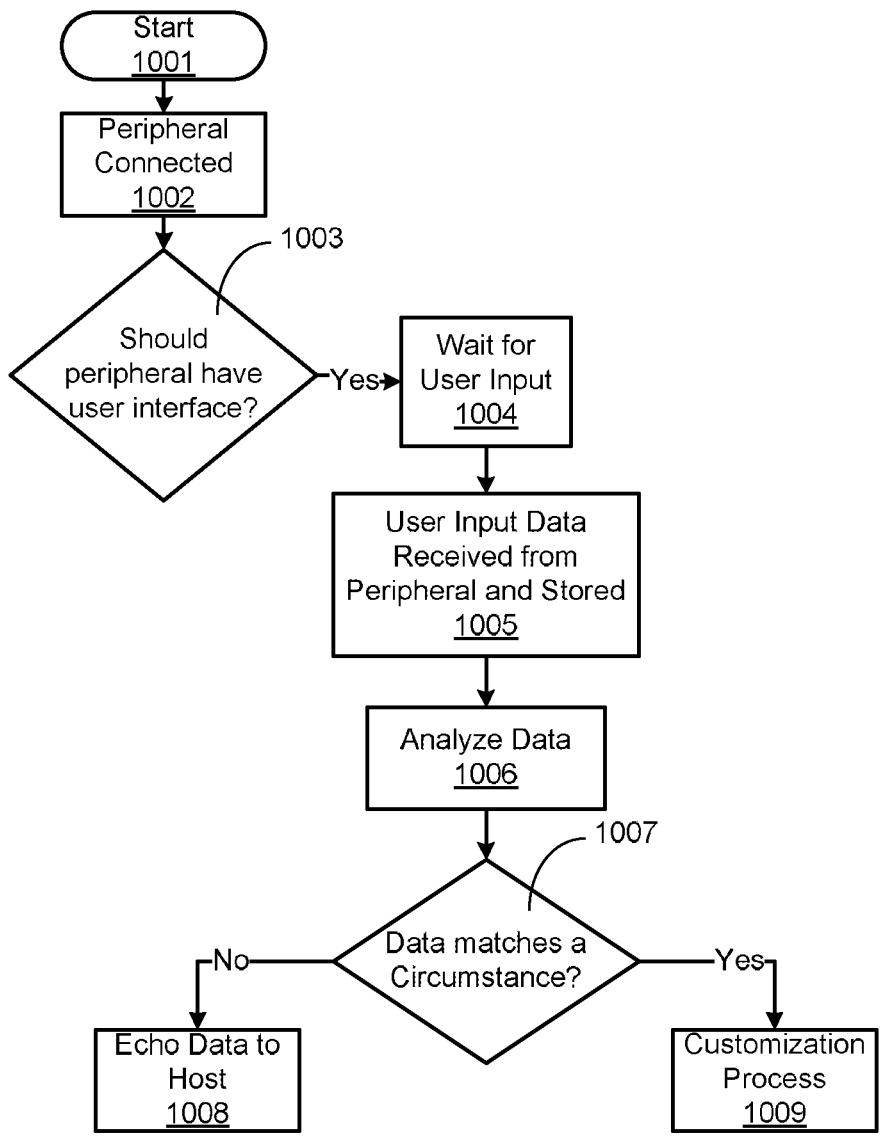
FIG. 10 is a block diagram showing logical flow associated with input customization in accordance with an embodiment of the present invention.

FIG. 10 is a block diagram showing logical flow associated with input customization in accordance with an embodiment of the present invention. The process starts at item 1001. In process 1002, the peripheral is connected and data is received from the peripheral device characterizing its nature. If the nature of the device is determined to have a user interface process 1003, then the in process 1004, the program logic waits for user input. In process 1005, user input data is received from the peripheral device purporting to be attributable to user input and stored. Then in process 1006, the stored data is analyzed to identify a circumstance defined by an identification rule. In process 1007, there is a determination whether the data matches a circumstance defined by the rule. If the determination is that there is a match, then a customization process 1009 defined by a customization rule is implemented and program flow ends in process 1011. If the determination in process 1007 is that there is not a match, then process 1008, the data is echoed to the host computing device program flow ends in process 1010. One embodiment of the circumstance may be to disallow certain keyboard or mouse functions, such as print screen, copy/paste, right click, or the insert key. In addition, the circumstance may be tied to software in such a way that certain functions are disallowed when certain software is running on the host computing device, peripheral device, or networks of either one. In yet another embodiment, data such as key strokes is logged to detect certain combinations of key strokes. A protection process may be implemented if a harmful combination of key strokes is received, which could, for example, block the harmful communication and/or notify the user. An emergency process could be implemented if a specific combination of key strokes, or a "panic keystroke," is received. In the emergency process, for example, normal echoing of key strokes may be inhibited and there may be implemented processes either on the security module itself or on the host computing device or the peripheral device or on the networks of either. Some embodiments include triggering a silent alarm, displaying a blue screen, accessing the internet, self destructing, or deleting data on one of the security module, host computing device, peripheral device, or networks of either.

Figure 11:
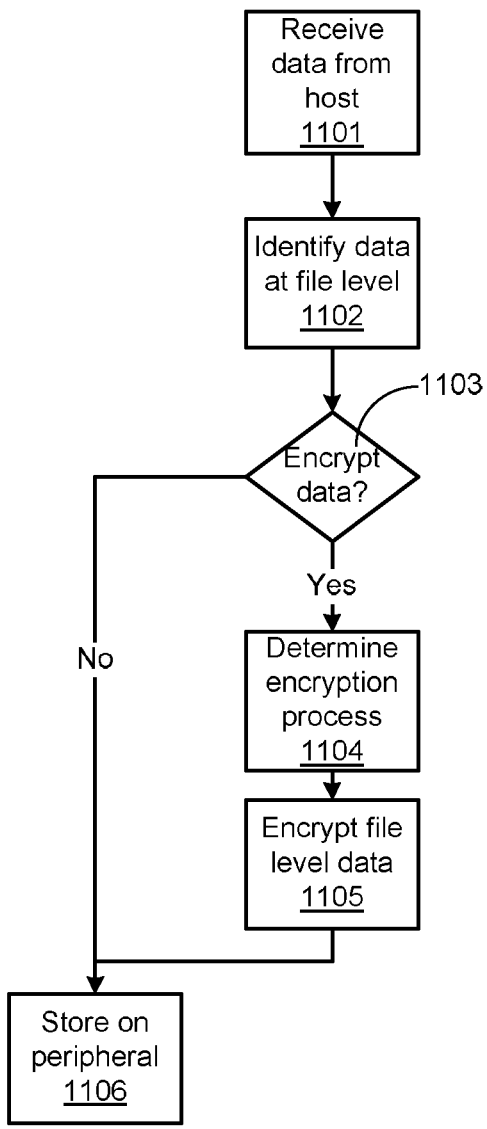
FIG. 11 is a block diagram showing logical flow associated with file level encryption in accordance with an embodiment of the present invention.

FIG. 11 is a block diagram showing logical flow associated with file level encryption in accordance with an embodiment of the present invention. Data is first received from the host computing device in process 1101. In process 1102, there is then implemented identifying data at a file level being subject to a write command to the peripheral device. In process 1103, there is a determination whether the data is to be encrypted according to a rule. If process 1103 leads to a determination to encrypt the data, then in process 1104 an encryption process is determined. In process 1105, the file level data is subject to the encryption process, which may be distinct for each file. If in process 1103, there is a determination not to encrypt the data, then no encryption steps are followed. Finally in process 1106, the data is stored, either encrypted or not encrypted, on the peripheral device. Since in one embodiment the peripheral device may be part of the host computing device, the encrypted data may be stored on a hard drive of the host computing device. In one embodiment, the encryption process is also dependent on the location or address where the data is stored after encrypting. The encryption process may also be configured in relation to a key derived from a user password as well as a pseudorandom number, in such a manner that the key changes with every file that is encrypted. In one embodiment, advanced hashing search algorithms are implemented to meet timing requirements.

Figure 12:
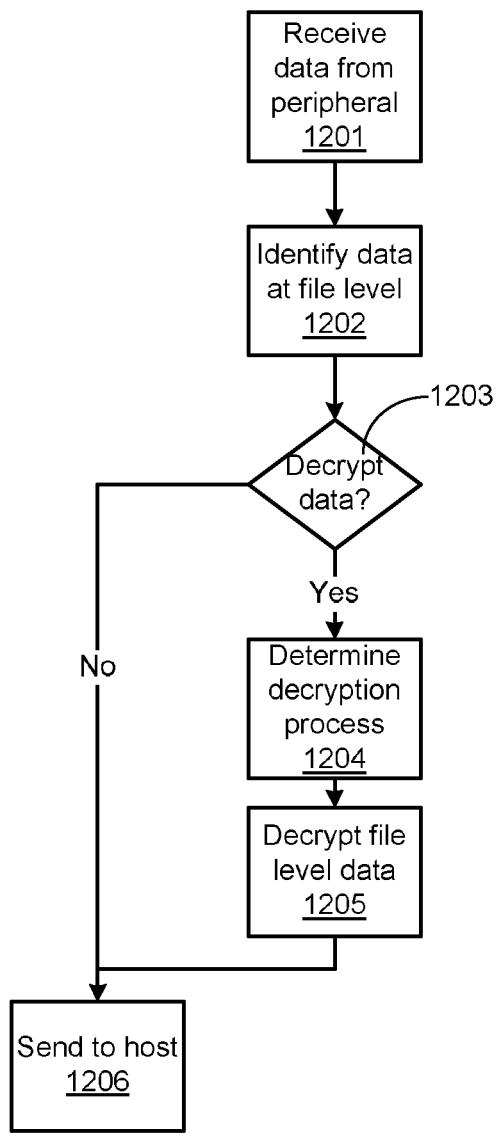
FIG. 12 is a block diagram showing logical flow associated with file level decryption in accordance with an embodiment of the present invention.

FIG. 12 is a block diagram showing logical flow associated with file level decryption in accordance with an embodiment of the present invention. Data is first received from the peripheral device in process 1201. Next, in process 1202 there is implemented identifying data at a file level being subject to a read command to the host computing device. In process 1203, there is a determination whether to decrypt the data according to a rule. If there is a determination to decrypt the data, then in process 1204 the decryption process is determined. Next in process 1205 the file level data is subject to the decryption process, which may be distinct for each file. If in process 1203, there is a determination not to decrypt the data, then no decryption steps are followed. Finally in process 1206, the data is stored, either decrypted or not decrypted, on the host computing device. In one embodiment, a rule defines which host computing devices are allowed to decrypt certain files or types of files.

Figure 13:
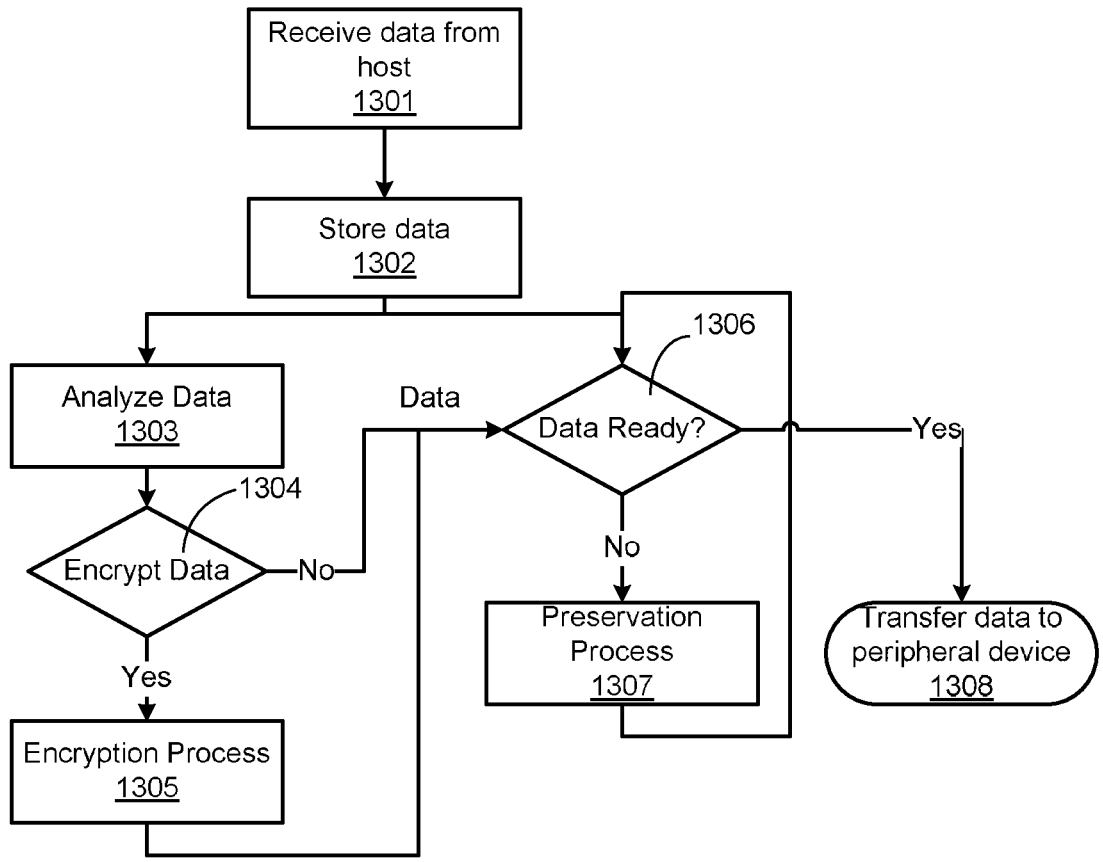
FIG. 13 is a block diagram showing logical flow associated with transmission encryption in accordance with an embodiment of the present invention.

FIG. 13 is a block diagram showing logical flow associated with transmission encryption in accordance with an embodiment of the present invention. In process 1301, data is first received from the host computing device and subsequently stored in process 1302. Following this, two sub-processes are run in parallel. In sub-process 1303, the stored data is analyzed to determine an analysis of what part thereof, if any, to encrypt. In process 1304, based on the analysis, there is a determination whether to encrypt the data. If in process 1304, there is a determination to encrypt the data, then an encryption process 1305 is implemented in accordance with the analysis for forwarding to the peripheral device (following a data readiness test to be described) in process 1308. If in process 1304, there is a determination not to encrypt the data, then the unencrypted data is transferred to the peripheral device (again following the data readiness test to be described) in process 1308. In sub-process 1306, data readiness from blocks 1304 and 1305 is tested. If the data is determined to be ready, data is transferred to the peripheral device in process 1308, either encrypted or unencrypted. If data is determined to be not ready, a preservation process 1307 (such as previously described in connection with FIGS. 2 and 3) is implemented that precludes inter-device communication termination.

Figure 14:
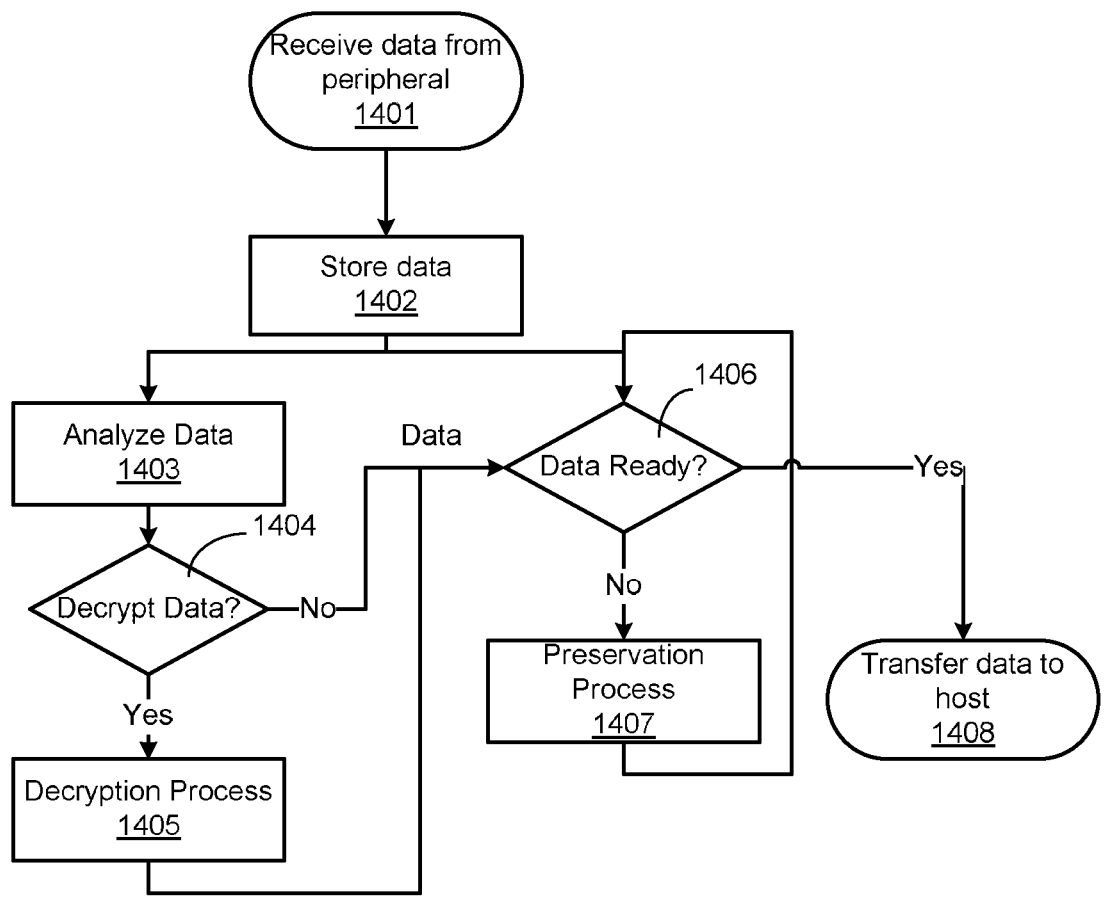
FIG. 14 is a block diagram showing logical flow associated with transmission decryption in accordance with an embodiment of the present invention.

FIG. 14 is a block diagram showing logical flow associated with transmission decryption in accordance with an embodiment of the present invention. Data is first received from the peripheral device in process 1401 and subsequently stored in process 1402. Following this, two sub-processes are run in parallel. In sub-process 1403, the stored data is analyzed to determine an analysis of what part thereof, if any, to decrypt. If in process 1403, there is a determination to decrypt the data, then a decryption process 1405 is implemented in accordance with the analysis for forwarding to the host computing device in process 1408. If there is a determination in process 1404 not to decrypt the data, then the encrypted data is transferred to the host computing device in process 1408. In the other sub-process 1406, data readiness from blocks 1404 and 1405 is tested. If the data is determined to be ready, data is transferred to the host computing device in process 1408, either decrypted or encrypted. If data is determined not to be ready, a preservation process 1407 is implemented that precludes inter-device communication termination.

Figure 15:
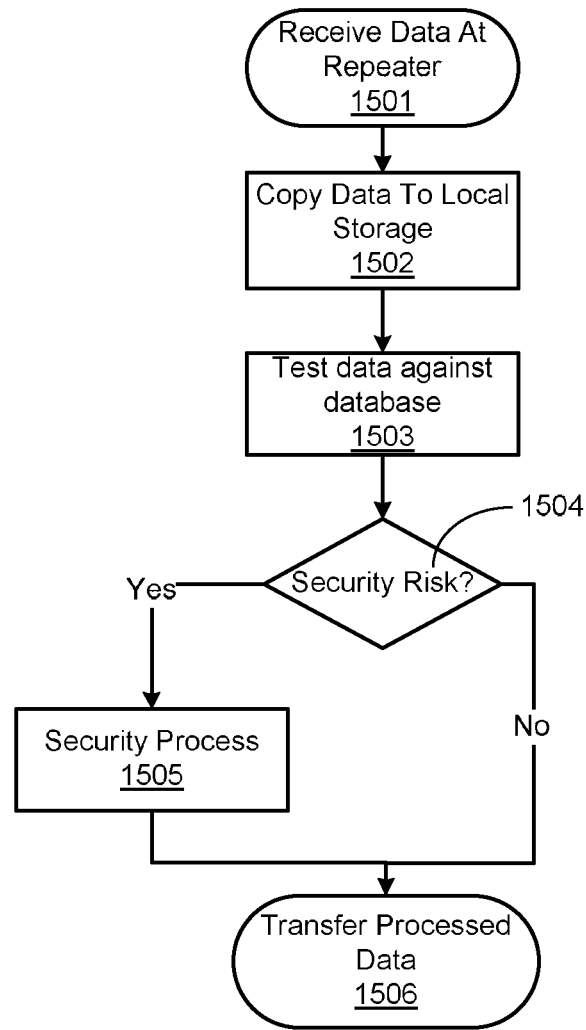
FIG. 15 is a block diagram showing logical flow associated with attack fingerprinting in accordance with an embodiment of the present invention.

FIG. 15 is a block diagram showing logical flow associated with attack fingerprinting in accordance with an embodiment of the present invention. In process 1501, data is received from one of the peripheral device and the host computing device. In process 1502, the received data is stored. In addition, process 1503 implements an analyzing process that tests received data against a database to identify a circumstance posing a security risk. In one embodiment, a hash search algorithm is used to search the database. In one embodiment, the database contains attack patterns and/or fingerprints of known and/or anticipated attacks. This database can be updated, for example directly or through the host computing device or peripheral device. In process 1504, there is a determination whether the analyzing process has identified a circumstance posing a security risk. If there is not a determination of a security risk in process 1504, then in process 1506, the data is echoed to the other of the peripheral device and the host computing device. If however, in process 1504, there is a determination of a circumstance posing a security risk, then a security process 1505 defined by a rule is performed. In one embodiment, the security process may send modified data to the other of the peripheral device and the host computing device. In another embodiment, the security process may include at least one of blocking the data, logging the attack, and notifying the user. The security process may also include transmitting information regarding the attack to a centralized location. The security process may also use information regarding the attack to update the database and to predict future attacks.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of enhancing security of at least one of a host computing device and a peripheral device, the host computing device removably coupled to the peripheral device through an interface for communication according to a protocol for inter-device communication, the method comprising:

receiving data from a first one of the peripheral device and the host computing device transparently in such a manner that the other one of the host computing device and the peripheral device, in the course of communication, fails to detect a node in addition to the first one of the peripheral device and the host computing device;

implementing a preservation process that precludes inter-device communication termination that would otherwise occur under the protocol, wherein the preservation process includes sending a signal other than a data echo;

storing the received data;

analyzing the stored data to identify a circumstance posing a security risk;

if analyzing does not identify such a circumstance, then echoing the data to the other of the peripheral device and the host transparently in such a manner that the recipient of such echoing, in the course of communication, fails to detect a node in addition to the first one of the peripheral device and the host computing device;

if analyzing does identify such a circumstance, then performing a security process defined by a rule.

2. A method of enhancing security of at least one of a host computing device and a peripheral device, the host computing device removably coupled to the peripheral device through an interface for communication according to a protocol for inter-device communication, the method comprising:

receiving data from one of the peripheral device and the host computing device;

storing the received data;

implementing a preservation process that precludes inter-device communication termination that would otherwise occur under the protocol, wherein the preservation process includes sending a signal other than a data echo;

analyzing the stored data to identify a circumstance posing a security risk;

if analyzing does not identify such a circumstance, then echoing the data to the other of the peripheral device and the host;

if analyzing does identify such a circumstance, then performing a security process defined by a rule.

3. A method according to any one of claims 1 and 2, wherein the signal is a no-acknowledge signal.

4. A method according to any one of claims 1 and 2, wherein the security process includes restricting communication between the host and the peripheral in accordance with the rule.

5. A method according to any one of claims 1 and 2, wherein the security process includes delaying transmission of data between the host and the peripheral in accordance with the rule.

6. A method according to any one of claims 1 and 2, wherein the rule is dynamic and is selected from a plurality of rules, the plurality of rules being stored on the host device.

7. A method according to any one of claims 1 and 2, wherein the rule is dynamic and is selected from a plurality of rules, the plurality of rules being stored on the peripheral device.

8. A security device for enhancing security of at least one of a host computing device and a peripheral device, the host computing device removably coupled to the peripheral device through an interface for communication according to a protocol for inter-device communication, the security device comprising an apparatus running processes comprising:
   receiving data from a first one of the peripheral device and the host computing device transparently in such a manner that the other one of the host computing device and the peripheral device, in the course of communication, fails to detect a node in addition to the first one of the peripheral device and the host computing device;
   implementing a preservation process that precludes inter-device communication termination that would otherwise occur under the protocol, wherein the preservation process includes sending a signal other than a data echo;
   storing the received data;
   analyzing the stored data to identify a circumstance posing a security risk;
   if analyzing does not identify such a circumstance, then echoing the data to the other of the peripheral device and the host transparently in such a manner that the recipient of such echoing, in the course of communication, fails to detect a node in addition to the first one of the peripheral device and the host computing device;
   if analyzing does identify such a circumstance, then performing a security process defined by a rule.

9. A security device for enhancing security of at least one of a host computing device and a peripheral device, the host computing device removably coupled to the peripheral device through an interface for communication according to a protocol for inter-device communication, the security device comprising an apparatus running processes comprising:
   receiving data from one of the peripheral device and the host computing device;
   storing the received data;
   implementing a preservation process that precludes inter-device communication termination that would otherwise occur under the protocol, wherein the preservation process includes sending a signal other than a data echo;
   analyzing the stored data to identify a circumstance posing a security risk;
   if analyzing does not identify such a circumstance, then echoing the data to the other of the peripheral device and the host;
   if analyzing does identify such a circumstance, then performing a security process defined by a rule.

10. The security device according to claim 8, wherein the signal is a no-acknowledge signal.

11. The security device according to claim 9, wherein the signal is a no-acknowledge signal.

* * * * *